(12) United States Patent
van den Broeke

(10) Patent No.: US 12,231,273 B2
(45) Date of Patent: Feb. 18, 2025

(54) MOBILE COMMUNICATION BASE STATION SYSTEM AND METHOD

(71) Applicant: NXP B.V., Eindhoven (NL)

(72) Inventor: Leendert Albertus Dick van den Broeke, Malden (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/481,414

(22) Filed: Oct. 5, 2023

(65) Prior Publication Data

US 2024/0223422 A1 Jul. 4, 2024

(30) Foreign Application Priority Data

Dec. 30, 2022 (EP) ..................... 22217294

(51) Int. Cl.
*H04L 27/26* (2006.01)
*H04L 5/00* (2006.01)

(52) U.S. Cl.
CPC ........ *H04L 27/2602* (2013.01); *H04L 5/0007* (2013.01)

(58) Field of Classification Search
CPC ... H04L 27/2602; H04L 5/0007; H04L 5/001; H04L 27/26025; H04L 27/2603; H04L 27/26035
See application file for complete search history.

(56) References Cited

U.S. PATENT DOCUMENTS

2017/0238320 A1* 8/2017 Fukuta .............. H04W 72/0453
370/329
2018/0183855 A1* 6/2018 Sabella ................. G06F 9/5072
2020/0033849 A1* 1/2020 Yiu ....................... H04W 76/27

FOREIGN PATENT DOCUMENTS

EP 3339893 A1 6/2018

OTHER PUBLICATIONS

U.S. Appl. No. 18/476,397, filed Sep. 28, 2023—not yet published; 33 pages.
Lin, Zhibin et al.: "Interleaved OFDM Signals for MIMO Radar"; IEEE Sensors Journal, vol. 15, No. 11; 12 pages (Nov. 2015).
ETSI; "5G; NR; Physical channels and modulation (3GPP TS 38.211 version 16.2.0 Release 16)"; retrieved from the Internet http://www.etsi.org/standards-search; 136 pages (Jul. 2020).

(Continued)

*Primary Examiner* — Khanh C Tran

(57) ABSTRACT

A mobile communication base station for joint communication and sensing and method of operation of a mobile communication base station is described. The mobile communication base station includes a baseband processor configurable to transmit and receive sensing and communication signals via one or channels. Each channel is configurable in one or more of a communications-transmit mode, a communications-receive mode, a sense-transmit mode and a sense-receive mode. For each channel, the baseband processor includes a carrier mapping-demapping module and a sense module. The baseband processor includes a controller coupled to the carrier mapping-demapping module and configured to control the carrier mapping-demapping module of the one or more channels to map the plurality of transmit-OFDM-symbols to a bandwidth part of an available OFDM bandwidth in the sense-transmit mode and the communications-transmit mode.

20 Claims, 9 Drawing Sheets

(56) References Cited

OTHER PUBLICATIONS

Cohen, David et al; "High Resolution FDMA MIMO Radar"; IEEE Transaction On Aerospace and Electronic Systems, vol. 56, No. 4; 17 pages; Aug. 4, 2020.
Zhang J Andrew et al.: "An Overview of Signal Processing Techniques for Joint Communication and Radar Sensing", IEEE Journal of Selected Topics in Signal Processing, IEEE, US, vol. 15, No. 6, Sep. 16, 2021 (Sep. 16, 2021), pp. 1295-1315.
Hakan Andersson Y; Ericsson Blog; Joint Communication and sensing in 6G networks; Ericsson Research; Jun. 23, 2022, 14 pages.
Akanksha Sneh et al.: "IEEE 802.11 ad Based Joint Radar Communication Transceiver: Design, Prototype and Performance Analysis", arxiv.org, Cornell University Library, 201 Olin Library Cornell University Ithaca, NY 14853, Sep. 9, 2022 (Sep. 9, 2022).
Xu Chen et al: "Downlink and Uplink Cooperative Joint Communication and Sensing", arxiv.org, Cornell University Library, 201 Olin Library Cornell University Ithaca, NY 14853, Nov. 8, 2022 (Nov. 8, 2022) 14 pages.
NXP Semiconductors Objective Datasheet "MMW9014K 24.25 GHZ-27.5 GHz 4-Channel Dual-Polarized Analog Beamforming Integrated Circuit", 3 pages—retrieved from internet on Oct. 4, 2023 (https://www.nxp.com/products/radio-frequency/5g-mmwave/24-25-27-5-ghz-4-channel-analog-beamforming-integrated-circuit:MMW9004KC).

\* cited by examiner

500

520

MOBILE COMMUNICATION BASE STATION SYSTEM AND METHOD

CROSS-REFERENCE TO RELATED APPLICATIONS

This application claims priority under 35 U.S.C. § 119 to European patent application no. 22217294.2, filed 30 Dec. 2022, the contents of which are incorporated by reference herein.

FIELD

The present disclosure relates to a mobile communication base station for joint communication and sensing and method of operation of a mobile communication base station.

BACKGROUND

Mobile communications cellular networks such as networks supporting 4G, 5G or future mobile communications standards may use base transceiver stations (BTS) or base stations including antenna systems which support multiple-input multiple output (MIMO) communications using beamforming techniques to improve the network capacity and coverage.

These antenna systems include an array of antennas, typically implemented as patch antennas arranged in a regular rectangular grid. The pitch or spacing of the patch antennas is determined by the wavelength of the communications frequency used in transmission or reception.

In operation, beamforming and/or beam-steering is used both in transmit mode to focus the direction of the transmitted RF signal towards another BTS or a user equipment receiver (UE) for example a mobile phone and in receive mode to improve the sensitivity of a signal transmitted from a user equipment transmitter.

Beamforming requires two or more antennas to be operated in either transmit (TX) or receive (RX) mode. In transmit mode the phase and amplitude of the signal is adjusted for each of the relevant antenna to form the desired beam direction. In receive mode, the received signals from multiple antenna patches are combined using signal processing techniques to selectively receive signals from a desired beam direction and suppress unwanted signals. Beamforming may be implemented in either the analog or digital domain.

The antenna systems can be configured to use different numbers of antennas in transmit and receive modes. In transmit mode this results in a trade-off between the power of the transmitted signal and the narrowness of the transmitted beam. Using more antennas results in a higher power and narrower beam. In receive mode using more antennas results in greater sensitivity in a particular direction and a narrower reception angle.

Such antenna systems can be used to form numbers of communication channels between different user equipment and the rest of the mobile communications network. In 5G communication standards time division duplex (TDD) is used for communication over a channel. In TDD the same frequency is used for transmission and reception.

Mobile communications networks may add sensing capabilities to communication, since an increasing number of applications use both communication and sensing. Additionally, extending communication base stations, referred to as "Next Generation Node B" (gNB) in $3^{rd}$ Generation Partnership Project (3GPP) terms, with sensing capability enhances the throughput as beamforming and user tracking can be performed more efficiently.

SUMMARY

Aspects of the disclosure are defined in the accompanying claims. In a first aspect, there is provided a mobile communication base station for joint sensing and communication, the mobile communication base station comprising: a baseband processor configurable to transmit and receive sensing and communication signals via one or more channels and further configurable in one or more of a communications-transmit mode, a communications-receive mode, a sense-transmit mode and a sense-receive mode, the baseband processor comprising, for each of the one or more channels: a carrier mapping-demapping module configured to: (i) in the communications-transmit mode and the sense-transmit mode, receive a plurality of transmit-OFDM-symbols, map the transmit-OFDM-symbols to a sub-carrier and output a plurality of mapped-transmit-OFDM-symbols, and (ii) in the communications-receive mode, receive a plurality of mapped-receive-OFDM-symbols, de-map the mapped-receive-OFDM-symbols and output a plurality of receive-OFDM-symbols; a sense module configured in the sense-receive mode to compare the plurality of mapped-receive-OFDM-symbols with the plurality of transmit-OFDM-symbols from the same channel or a different channel; and determine at least one of a range, velocity, and angle-of-arrival of a sensed object from the comparison; and wherein the baseband processor further comprises: a controller coupled to the carrier mapping-demapping module and configured to control the carrier mapping-demapping module of the one or more channels to: map the plurality of transmit-OFDM-symbols to a bandwidth part of an available OFDM bandwidth in the sense-transmit mode and the communications-transmit mode.

In some embodiments, the baseband processor further comprises: a frequency-to-time conversion module configured to, in each of the communications-transmit mode and the sense-transmit mode, receive the plurality of mapped-transmit-OFDM-symbols from the carrier mapping-demapping module of at least one channel of the one of more channels and output a transmit-baseband-signal; and a time-to-frequency conversion module configured to, in each of the communications-receive mode and the sense-receive mode, receive a receive-baseband-signal and output the plurality of mapped-receive-OFDM-symbols to the carrier mapping-demapping module of the at least one channel.

In some embodiments, the frequency-to-time conversion module comprises an Inverse Fast Fourier Transform (IFFT) and a cyclic prefix (CP) module and the time-to-frequency conversion module comprises an inverse FFT and a cyclic prefix removal (CP-R) module.

In some embodiments, the controller is further configured to control the carrier mapping-demapping module to: in the sense-transmit mode, map the plurality of transmit-OFDM-symbols on sub-carriers within segments of a bandwidth part of the available OFDM bandwidth.

In some embodiments, the sense module further comprises a series arrangement of a divider, a frequency-to-time conversion module, a time-to-range conversion module and an FFT module.

In some embodiments, the baseband processor further comprises: a digital beamformer configured and arranged to beamform the plurality of transmit-OFDM-symbols for transmission via an antenna array in the communications-transmit mode or sense-transmit mode and to beamform the plurality of mapped-receive-OFDM-symbols received via the antenna array in the communications-receive mode or sense-receive mode.

In some embodiments, the mobile communication base station further comprises a digital front-end and an analog front-end. The digital front-end comprises: a digital to analog converter configured in the communications-transmit mode or sense-transmit mode to convert the transmit-baseband-signal to an analog transmit-baseband-signal; an analog to digital converter configured in the communications-receive mode or sense-receive mode to convert an analog receive-baseband-signal to the receive-baseband-signal; and the analog front-end comprising: an up-down converter; a transmit amplifier and receive amplifier; and at least one antenna; wherein the analog-front end is configured to: in the communications-transmit mode or sense-transmit mode, up-convert the analog transmit-baseband-signal to a transmit-signal transmitted via the transmit amplifier and the at least one antenna; and in the communications-receive mode or sense-receive mode, down-convert a receive-signal to the receive-baseband-signal, the receive-signal being received via the at least one antenna and the receive amplifier.

In some embodiments, the at least one antenna comprises a plurality of antennas, and the analog front-end further comprises: an analog beamformer configured and arranged to: in the communications-transmit mode or sense-transmit mode, beamform the analog transmit-signal for transmission via the plurality of antennas; and in the communications-receive mode or sense-receive mode, beamform the analog receive signal received via the plurality of antennas.

In some embodiments, the one or more channels comprises a plurality of channels and wherein: a first channel of the plurality of channels is configured in the sense-transmit mode to transmit in a first beam direction; a second channel of the plurality of channels is configured in the sense-receive mode to receive in a second beam direction; a third channel of the plurality of channels is configured in the sense-transmit mode to transmit in a third beam direction; and a fourth channel of the plurality of channels is configured in the sense-receive mode to receive in a fourth beam direction.

In some embodiments, the one or more channels comprises a plurality of channels and a first channel of the plurality of channels is configured in the sense-transmit mode to transmit in a first beam direction; a second channel of the plurality of channels is configured in the sense-receive mode to receive in a second beam direction; a third channel of the plurality of channels is configured in the communications-transmit mode to transmit in a third beam direction; or in the communications-receive mode to receive in the third beam direction; a fourth channel of the plurality of channels is configured in the communications-transmit mode to transmit in a fourth beam direction; or in the communications-receive mode to receive in the fourth beam direction.

In some embodiments, the bandwidth of the bandwidth part of the first channel and the bandwidth part of the second channel is different to the bandwidth of the bandwidth part of the third channel and the bandwidth part of the fourth channel.

In some embodiments, the one or more channels comprises a plurality of channels. A first channel of the plurality of channels is configured in the sense-transmit mode to transmit a first beam; a second channel of the plurality of channels is configured in the sense-receive mode to receive a second beam; a third channel of the plurality of channels is configured in the sense-transmit mode to transmit a third beam; a fourth channel of the plurality of channels is configured in the sense-receive mode to receive a fourth beam; a fifth channel of the plurality of channels is configured in the communications-transmit mode to transmit a fifth beam; or in the communications-receive mode to receive a fifth beam; a sixth channel of the plurality of channels is configured in the communications-transmit mode to transmit a sixth beam; or in the communications-receive mode to receive a sixth beam; a seventh channel of the plurality of channels is configured in the communications-transmit mode to transmit a seventh beam; or in the communications-receive mode to receive a seventh beam; an eighth channel of the plurality of channels is configured in the communications-transmit mode to transmit an eighth beam; or in the communications-receive mode to receive an eighth beam; wherein the bandwidth of the bandwidth part of the first channel, the second channel, the third channel, and the fourth channel is the same bandwidth; and wherein the mapped-transmit-OFDM-symbols of the first beam are interleaved in different segments of the bandwidth part than the mapped-transmit-OFDM-symbols of the third beam.

In some embodiments, a first channel of the one or more channels is configured in a sense-transmit mode and a second channel of the one or more channels is configured in a sense-receive mode; and wherein the first channel is configured to: map each sensing OFDM symbol of a plurality of OFDM sensing symbols on a respective carrier in a bandwidth part; convert a sensing OFDM signal to the time-domain, the sensing OFDM signal comprising the plurality of mapped OFDM sensing symbols; convert the time-domain OFDM sensing signal to an analog sensing signal; up-convert the analog sensing signal; transmit a transmit signal comprising the up-converted analog sensing signal; and the second channel is configured to: down-convert a receive signal comprising the plurality of OFDM sensing symbols; convert the down-converted receive signal to a digital down-converted receive signal; convert the digital down-converted receive signal to the frequency domain; and determine at least one of the range, velocity and angle of arrival from a comparison of the digital down-converted receive signal and the plurality of OFDM sensing symbols.

Embodiments of the mobile communication base station may be included in a mobile communication system. The mobile communication system may comprise a plurality of mobile communication base stations. A channel of one or more of the plurality of mobile communication base stations may be configured in the sense-transmit mode and a user equipment apparatus may be configured in a user equipment sense-receive mode to detect a transmitted sense signal from the one or more of the plurality of base stations In some embodiments, a channel of a first mobile communication base station of the plurality of mobile communication base stations is configured in the sense-transmit mode and a channel of a second mobile communication base station of the plurality of mobile communication base stations is configured in the sense-receive mode.

In a second aspect, there is defined a method of joint sensing and communication for a mobile communication base station configurable to transmit and receive sensing and communication signals via one or more channels and further configurable in one or more of a communications-transmit mode, a communications-receive mode, a sense-transmit mode and a sense-receive mode, the method comprising, for each of the one or more channels: (i) in the communications-transmit mode and the sense-transmit mode, receiving a plurality of transmit-OFDM-symbols, mapping the transmit- OFDM-symbols to a sub-carrier and outputting a plurality of mapped-transmit-OFDM-symbols, and (ii) in the communications-receive mode, receiving a plurality of mapped-receive-OFDM-symbols, de-mapping the mapped-receive-OFDM-symbols and outputting a plurality of receive-OFDM-symbols; in the sense-receive mode, comparing the plurality of mapped-receive-OFDM-symbols with the plurality of transmit-OFDM-symbols from the same channel or a different channel; and determining at least one of a range, velocity, and angle-of-arrival of a sensed object from the comparison; and wherein the method further comprises: mapping the plurality of transmit-OFDM-symbols to a bandwidth part of an available OFDM bandwidth in the sense-transmit mode and the communications-transmit mode.

In one or more embodiments, the method comprises in each of the communications-transmit mode and the sense-transmit mode, generating a transmit-baseband-signal by converting the plurality of mapped-transmit-OFDM-symbols from at least one channel of the one of more channels from the frequency domain to the time domain; and in each of the communications-receive mode and the sense-receive mode, generating a plurality of mapped-receive-OFDM-symbols by converting a receive-baseband-signal from at least one channel of the one or more channels from the time domain to the frequency domain.

In one or more embodiments, the method comprises in the sense-transmit mode, mapping the plurality of transmit-OFDM-symbols on sub-carriers within segments of the first bandwidth part of the available OFDM bandwidth.

In one or more embodiments, the method comprises digitally beamforming the plurality of transmit-OFDM-symbols for transmission via an antenna array in the communications-transmit mode or sense-transmit mode and digitally beamforming the plurality of mapped-receive-OFDM-symbols received via the antenna array in the communications-receive mode or sense-receive mode.

In one or more embodiments, the one or more channels comprises a plurality of channels, and the method further comprises: configuring a first channel of the plurality of channels in the sense-transmit mode for transmitting in a first beam direction; configuring a second channel of the plurality of channels in the sense-receive mode for receiving in a second beam direction; configuring a third channel of the plurality of channels in the sense-transmit mode for transmitting in a third beam direction; and configuring a fourth channel of the plurality of channels in the sense-receive mode for receiving in a fourth beam direction.

In one or more embodiments, the one or more channels comprises a plurality of channels, and the method further comprises: configuring a first channel of the plurality of channels in the sense-transmit mode for transmitting in a first beam direction; configuring a second channel of the plurality of channels in the sense-receive mode for receiving in a second beam direction; configuring a third channel of the plurality of channels in the communications-transmit mode to transmit in a third beam direction; or configuring the third channel in the communications-receive mode to receive in the third beam direction; and configuring a fourth channel of the plurality of channels in the communications-transmit mode to transmit in a fourth beam direction; or configuring the fourth channel in the communications-receive mode to receive in the fourth beam direction. In one or more embodiments, a first channel of the one or more channels is configured in a sense-transmit mode and a second channel of the one or more channels is configured in a sense-receive mode; and wherein the method comprises, configuring the first channel to: map each sensing OFDM symbol of a plurality of OFDM sensing symbols on a respective carrier in the bandwidth part; convert a sensing OFDM signal to the time domain, the sensing OFDM signal comprising the plurality of mapped OFDM sensing symbols; convert the time-domain OFDM sensing signal to an analog sensing signal; up-convert the analog sensing signal; transmit a transmit signal comprising the up-converted analog sensing signal; and the configuring the second channel to: down-convert a receive signal comprising the plurality of OFDM sensing symbols; convert the down-converted receive signal to a digital down-converted receive signal; convert the digital down-converted receive signal to the frequency domain; and determine at least one of the range, velocity and angle of arrival from a comparison of the digital down-converted receive signal and the plurality of OFDM sensing symbols.

BRIEF DESCRIPTION OF THE DRAWINGS

In the figures and description like reference numerals refer to like features. Embodiments are now described in detail, by way of example only, illustrated by the accompanying drawings in which:

FIGS. 9A and 9B illustrate a 1 GHz bandwidth covering maximum range and resolution; FIGS. 9C and 9D show a 250 MHz bandwidth part at the upper band edge covering maximum range at reduced resolution. FIGS. 9E and 9F show a 250 MHz accumulated bandwidth 1:4 interleaved 1 GHz spectrum, covering reduced range but full resolution.

Figure 1:
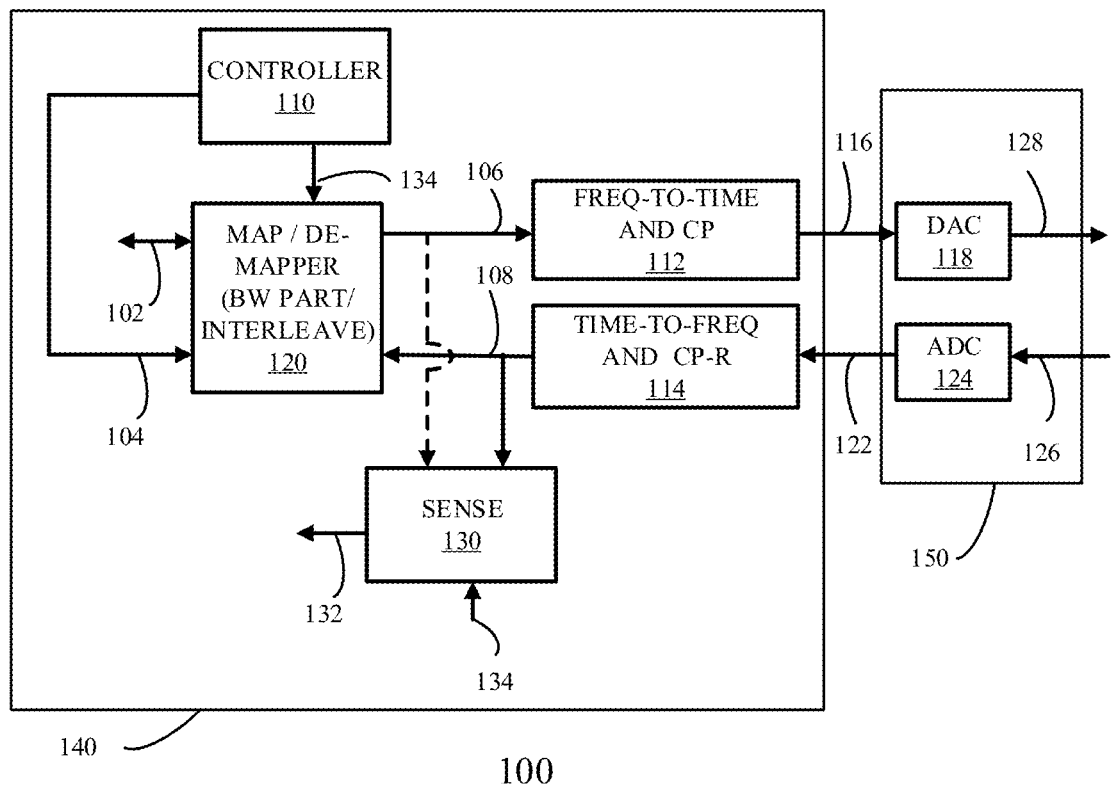
FIG. 1 shows a mobile communication base station including a baseband processor and a digital front-end for a single channel according to an embodiment.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

FIG. 1 shows a mobile communication base station 100 including a baseband processor 140 and a digital front-end 150 for a single channel according to an embodiment. The baseband processor 140 includes a carrier mapping-demapping module 120, a controller 110, a frequency-to-time and cyclic prefix addition module 112, a time-to-frequency and cyclic prefix recovery module 114, and a sense module 130. The digital front-end 150 includes a digital to analog converter (DAC) 118, and an analog to digital converter (ADC) 124. In some example base stations using digital beam forming, the frequency-to-time and cyclic prefix addition module 112, time-to-frequency and cyclic prefix recovery module 114, digital to analog converter (DAC) 118, and an analog to digital converter (ADC) 124 may be shared with other channels (not shown).

The controller 110 may have a mode control output 134 connected to the carrier mapping-demapping module 120 and the sense module 130 and other modules as appropriate (not shown). The carrier mapping-demapping module 120 may have a connection 102 which can receive and transmit orthogonal frequency division multiplexing (OFDM) symbols. Carrier mapping-demapping module 120 may have a carrier mapping input 104 which may be connected to the controller 110. The carrier mapping-demapping module 120 may have a transmit output 106 connected to the frequency-to-time and cyclic prefix addition module 112. The carrier mapping-demapping module may have a receive input connected to an output 108 of the time-to-frequency and cyclic prefix recovery module 114. The output 108 of the time-to-frequency and cyclic prefix recovery module 114 may be connected to a sense input of the sense module 130. The sense module 130 has an input connected to the transmit output 106. In other examples, the sense module 130 has an input connected to a transmit output of a different channel (not shown) instead of or in addition to the connection to the transmit output 106.

An output 116 of the frequency-to-time and cyclic prefix addition module 112 may be connected to an input of a DAC 118. The output 128 of the DAC 118 may be connected via further circuitry (not shown) to one or more antennas of an antenna array (not shown). An input 126 of the ADC 124 may be connected via further circuitry (not shown) to one or more antennas of an antenna array (not shown). An output 122 of the ADC 124 may be connected to an input of the time-to-frequency and cyclic prefix recovery module 114.

In operation, the controller 110 may configure the operation mode via mode control output 134. The operations mode may be one of a communications-transmit mode which may also be referred to as a Down Link (DL) mode, a sense-transmit (ST) mode, a communications-receive mode which may also be referred to as an Up Link (UL) mode, and a sense-receive (SR) mode.

In the communications-transmit mode, binary phase shift key (BPSK), quadrature phase-shift key (QPSK) or quadrature amplitude modulation (QAM) symbols are input to carrier mapping-demapping module 120 from connection 102. These symbols may be referred to in the present disclosure as transmit-OFDM symbols.

In terminology throughout this document, a symbol denotes a complex number (representing for example 1, 2, 4, 6 or 8 data bits) mapped on one of the carriers of an OFDM signal. In the transmit modes of operation, the mapping operation of the carrier mapping-demapping module consists of selecting an input of the inverse Fourier transform for every transmitted symbol. In the receive modes of operation, the de-mapping operation of the carrier mapping-demapping module consists of selecting an output of the Fourier transform for every received symbol.

The controller 110 may determine a bandwidth part (BWP) of the OFDM spectrum to use for sub-carrier (SC) mapping and provide that information to carrier mapping input 104. The transmit-OFDM symbols may be mapped onto in-phase (I) and quadrature (Q) values for every Sub Carrier (SC) resulting in a mapped-transmit-OFDM-symbol which is output on the transmit output 106. The mapped-transmit-OFDM-symbol is defined in the frequency domain. The frequency-to-time and cyclic prefix addition module 112 may implement an inverse discrete Fourier transform (IDFT), typically as an inverse Fast Fourier Transform (IFFT) function which converts the mapped-transmit-OFDM-symbol into the time-domain as a complex (i.e., I and Q) transmit baseband signal. The transmit-baseband-time signal is complemented by a Cyclic Prefix (CP) and digitized by the (IQ)DAC 118. The resulting analog transmit-baseband-signal on DAC output 128 is then sent to an analog front-end (not shown), upconverted into an RF signal by mixing with a Local Oscillator (LO) signal (not shown) and transmitted via an amplifier and antenna (not shown).

In the communications-receive mode, the operation is reversed in sequence with respect to the communications-transmit mode. An RF signal received via an antenna and receive amplifier (not shown) is down converted to an analog receive-baseband-signal provided to the (IQ)ADC 124. The ADC 124 converts the analog baseband signal to a digital complex receive-baseband-signal. The time-to-frequency and cyclic prefix recovery module 114 may remove the CP guard. The time-to-frequency and cyclic prefix recovery module 114 may implement a discrete Fourier transform (DFT), typically as a Fast Fourier Transform (FFT) function. The time-to-frequency and cyclic prefix recovery module 114 converts the time signal into the frequency domain equivalent and outputs the mapped-receive-OFDM-symbol on the output 108. The SC are selected (i.e. the mapped-received-OFDM-symbol is de-mapped) by the carrier mapping-demapping module 120 and processed by a channel equalizer (not shown) and then the resulting receive-OFDM-symbol may be output on the connection 102 before BPSK, QPSK or QAM decoding (not shown).

In the sense-transmit mode, the transmit-OFDM symbols are sense symbols which may implement a desired radar or sense transmission signal such as a FMCW signal. The controller 110 may determine a bandwidth part (BWP) of the OFDM spectrum to use for SC mapping and provide that information on mode control output 134 for the sense symbols. In other respects, the sense-transmit mode is the same as the communications-transmit mode.

In the sense-receive mode an RF signal including a sense signal is received via an antenna and receive amplifier (not shown) is down converted to an analog baseband signal provided to the (IQ)ADC 124. The ADC 124 converts the analog baseband signal to a digital complex baseband time signal. The time-to-frequency and cyclic prefix recovery module 114 may remove the CP guard. The time-to-frequency and cyclic prefix recovery module 114 converts the time signal into the frequency domain equivalent and outputs the mapped OFDM symbol on the output 108. The mapped-receive-OFDM-symbol may then be input to the sense module 130. The sense module 130 may determine one or more of range, angle-of-arrival, and speed of a sensed object by comparing the mapped-receive-OFDM-symbol with a mapped-transmit-OFDM-symbol including the sense symbol and outputting the range value, angle-of-arrival value and speed value on the sense module output 132. The mapped-transmit-OFDM-symbol may be provided by the carrier mapping-demapping module 120 on the transmit output 106 on the same channel. In other examples the transmitted sense symbol may be provided to the sense module 130 from another channel (not shown).

In the present disclosure, the base-station and operating method of a base station may use bandwidth parts for a different purpose to that for which they are normally intended. That is to say the bandwidth parts are used for sensing in a sensing mode rather than for reducing power consumption in the UE. Since the sensing modes of operation may require scanning, the beam direction of a sensing beam may be close to or the same as a communication beam or other sensing beam. Using BWPs may avoid interference between sensing and communication signals. By using bandwidth part(s) in a sensing mode, the base station may use the same antenna array for simultaneous sensing and communication modes of operation or multiple sensing operations in multiple bandwidth parts. The term sensing signal may refer to a transmit or receive signal in a sensing operation mode, i.e. sense-transmit or sense-receive mode. The term communications signal may refer to a transmit or receive signal in a communications operation mode, i.e. communications-transmit or communications-receive mode.

Figure 2:
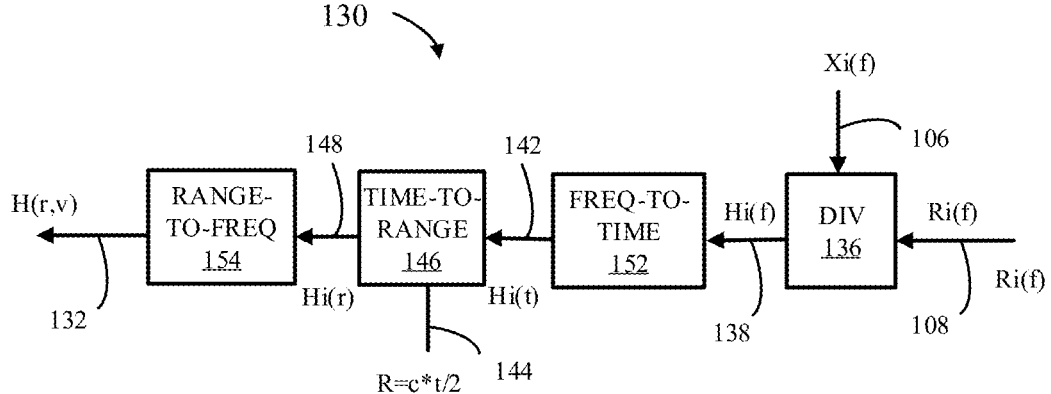
FIG. 2 illustrates an example sense module implementation for the mobile communication base station of FIG. 1.

FIG. 2 shows a detail of an example implementation of the sense module 130. A divider module 136 may have an input connected to an output 108 of the time-to-frequency and cyclic prefix recovery module 114. The divider module 136 may have an input connected to the transmit output 106. The divider module 136 may have an output 138 connected to an input of a frequency-to-time conversion module 152. The output 142 of the frequency to time conversion module 152 may be connected to a time-to-range conversion module 146. The time-to-range conversion module 146 may have a time-to-range conversion module control input 144. The time-to-range conversion module 146 may have time-to-range conversion module output 148 connected to a range-to-frequency conversion module 154. The output of the time-to-frequency conversion module 154 may be connected to the sense module output 132.

A division in the frequency domain of the received signal i.e. mapped-OFDM-receive symbol, denoted R(f) by the spectrum of the transmitted sense signal i.e. mapped-OFDM-transmit-symbol, denoted Xi (f) yields the channel transfer function in the frequency domain, denoted Hi(f). Potentially any waveform of X can be used, but typically a waveform such as a FMCW or other waveform which contains all frequency components is used, while the peak-to-average ratio of the Xi(t) signal is kept as low as possible. The frequency-to-time conversion module 152 may apply an IFFT or other IDFT transformation on Hi(f), resulting in a channel pulse response Hi(t). The distance to the objects in the field now show as individual pulses in this Hi(t) signal. The pulse amplitudes are a measure of the size of the sensed objects. The pulse response signal Hi(t) is scaled by the time-to-range conversion module 146 by a range factor R=c*t/2, resulting in range signal Hi(r) on the time-to-range conversion module output 148. A series of signals Hi(r) is converted by FFT module 154 which operates an FFT or other DFT transform over the series of signals Hi(r). This step additionally reveals the object velocity resulting in signal H(r, v).

During operation, in sense-receive mode any equalization which is used in the communications-receive mode is disabled by the controller 110, to avoid removing the channel information of interest when in the sense-receive mode. In some examples, the sense symbols may be regularly repeated.

In some examples, since antenna arrays allow for directivity, features may be added to derive angular selectivity. In some examples, in a sense-receive mode, a number of sensing events may be detected by beams having a beam direction covering a number of different angles. The beam angle resulting in the largest received amplitude determines the most likely direction of the object location.

Figure 3:
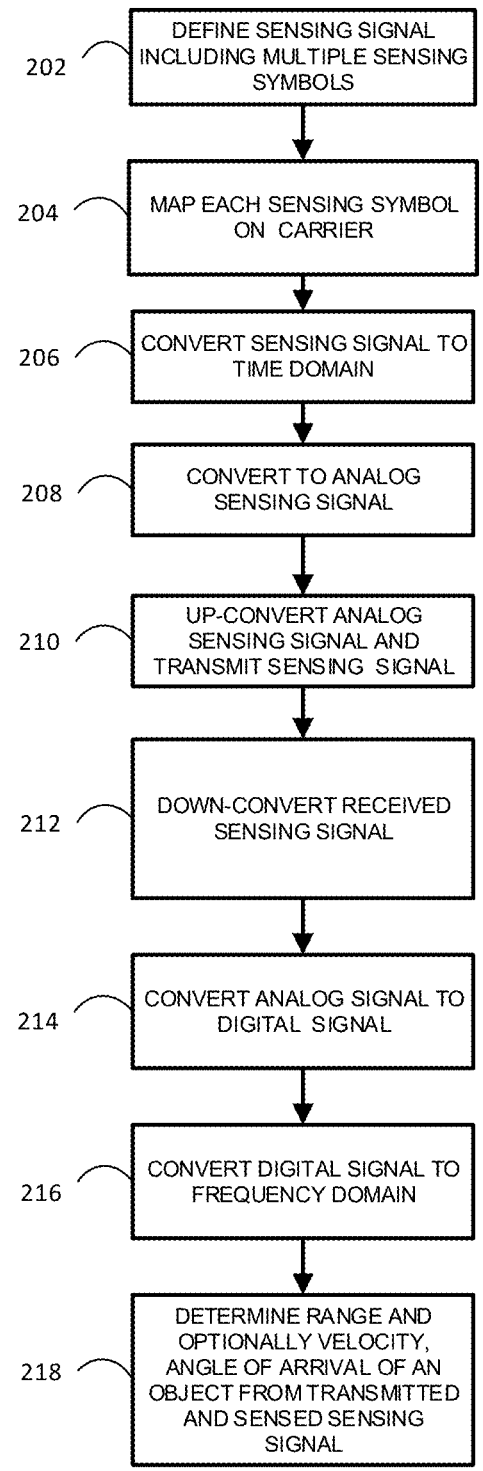
FIG. 3 shows a method of operating a mobile communication base station according to an embodiment.

FIG. 3 shows a method of operation 200 of a mobile communication base station in a sense mode operation mode including a sense-transmit mode and sense-receive mode according to an embodiment. In step 202 a sensing signal including a number of sensing symbols is defined. In step 204 the sensing symbols are mapped on multiple carriers using bandwidth parts and optionally interleaving. Interleaving in this context may include assigning or using segments of the bandwidth part for the sensing symbol leaving other segments of the bandwidth part available for other sensing or communication symbols. In step 206, the sensing signal is converted into the time domain. In step 208, the sensing signal is converted to an analog sensing signal. In step 210 the analog sensing signal is up converted and the resulting up-converted sensing signal which may also be referred to as a transmit-signal is transmitted. In step 212 the signal transmitted according to steps 202 to 210 is received. This received sensing signal may be on the same channel or a different channel of a mobile communications base station. The received sensing signal is down converted in step 212. In step 214 the down converted sensing signal which is a received-baseband-signal is converted to a digital signal.

In step 216, the digital signal is converted from the time domain to the frequency domain. In step 218 the range and optionally the velocity and the angle of arrival of an object is determined from the transmitted sensing signal and the sensed sensing signal. The method steps 202 to 206 may for example be implemented by the baseband processor 140 configured in a sense-transmit mode. Method step 208 may be performed by the digital front end 150. Method step 210 may be performed by an analog front-end. The method steps 212, 214 may be performed respectively by an analog front-end and for example a digital front-end 150 configured in a sense-receive mode. Steps 216 and 218 may for example be implemented by baseband processor 140 configured in a sense-receive mode. For full-duplex communication, two channels are required, one channel configured in the sense-transmit mode and one configured in the sense-receive mode. For a mobile communication base station, the full-duplex mode is the most commonly required because of the relatively short distances. For longer distances a single channel may be used time multiplexed between sense-transmit and sense-receive mode similarly to the communications modes of operation.

Figure 4:
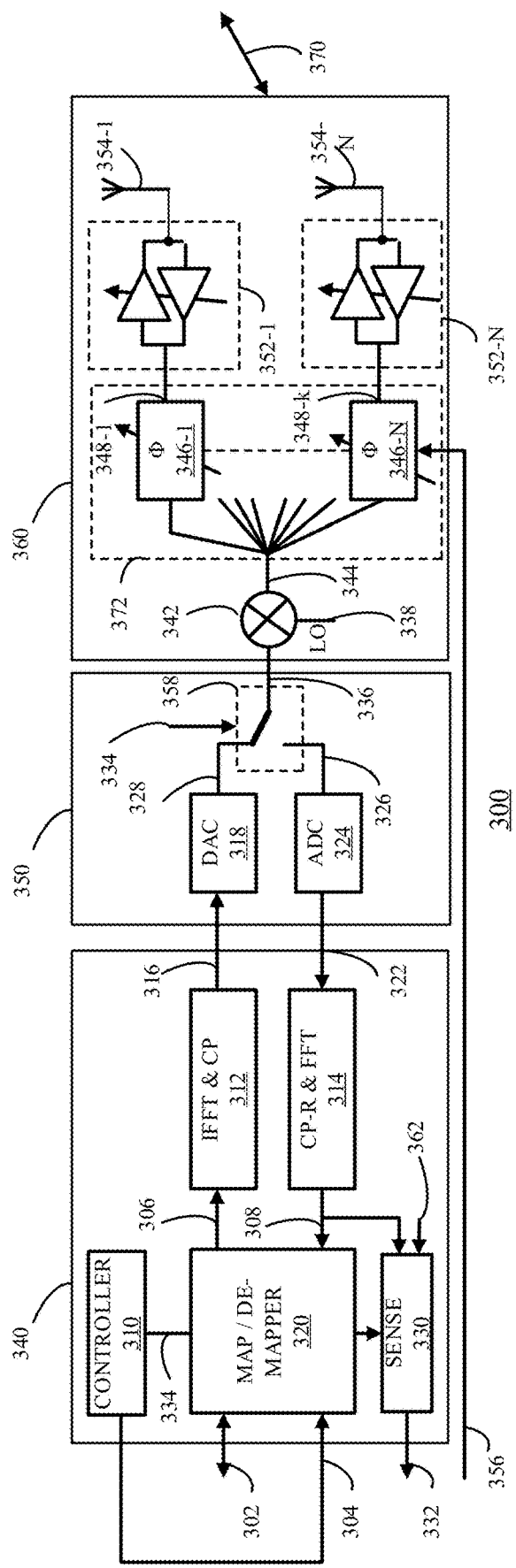
FIG. 4 shows a mobile communication base station including a baseband processor a digital front-end and an analog front-end for a single channel according to an embodiment.

FIG. 4 shows a mobile communication base station 300 for a single channel including a baseband processor 340, a digital front-end 350, and an analog front end 360 according to an embodiment. The baseband processor 340 may include a carrier mapping-demapping module 320, a controller 310, an inverse fast Fourier transform (iFFT) and cyclic prefix addition (CP) module 312, a fast Fourier transform (FFT) and cyclic prefix recovery (CP-R) module 314, a sense module 330. The digital front-end 350 may include a digital to analog converter (DAC) 318, an analog to digital converter (ADC) 324 and an antenna switch 358. The analog front-end 360 may include an up-down converter 342, analog beamformer (ABF) 372, transmit and receive amplifiers 352 (352-1 . . . 352-N), and antennas 354 (354-1 . . . 354-N). The controller 310 may have a control output 334 connected to the mapping de-mapping module 320 and the sense module 330. The carrier mapping-demapping module 320 may have a connection 302 which may receive or transmit orthogonal frequency division multiplexing (OFDM) symbols. Carrier mapping-demapping module 320 may have a carrier mapping input 304 which may be connected to a further control output of the controller 310. The carrier mapping-demapping module 320 may have a transmit output 306 connected to the iFFT and CP module 312. The carrier mapping-demapping module 320 may have a receive input connected to an output 308 of the FFT and CP-R module 314. The output 308 of the FFT and CP-R module 314 may be connected to a sense input of the sense module 330. The sense module 330 may also have a sense module input 362 which in some examples may be connected to the transmit output 306. In other examples, the sense module input 362 may have an input connected to a transmit output of a different channel (not shown).

An output 316 of the iFFT and CP module 312 may be connected to an input of a DAC 318. The output 328 of the DAC 318 may be connected to a first terminal of antenna switch 358. An input 326 of the ADC 324 may be connected to a second terminal of antenna switch 358. An output 322 of the ADC 324 may be connected to an input of FFT and CP-R module 314. A third terminal 336 of the antenna switch 358 may be connected to a first terminal of the up-down converter 342. The up-down converter 342 may have a local oscillator input 338 and a second terminal 344 connected to the analog beamformer 372. The analog beam former 372 includes a number N of beamformer elements 346-1 to 346-N each having a first beamformer element terminal connected to the second terminal 344 and second beamformer element terminal 348-1 to 348-$k$ connected to a respective transmit and receive amplifier 352-1 to 352-N. Each transmit and receive amplifier 352-1 to 352-N is connected to an antenna 354-1 to 354-N. A beam control input 356 which may also be referred to as the beam index input may be connected to the beamformer elements 346-1 to 346-N. The operation of the baseband processor 340 is similar to baseband processor 140 in the different operation modes.

Additionally, In the sense-transmit and communications-transmit modes, the controller 310 controls the antenna switch 358 via mode control output 334 to couple the DAC output 318 to the up-down converter 342. In the sense-receive and communications-receive modes, the controller 310 controls the antenna switch 358 via mode control output 334 to couple the ADC input 326 to the up-down converter 342. The beam direction 370 and shape is determined by the beam index per symbol applied to the beam control input 356 which controls the beamformer elements 346-1 to 346-N.

Figure 5:
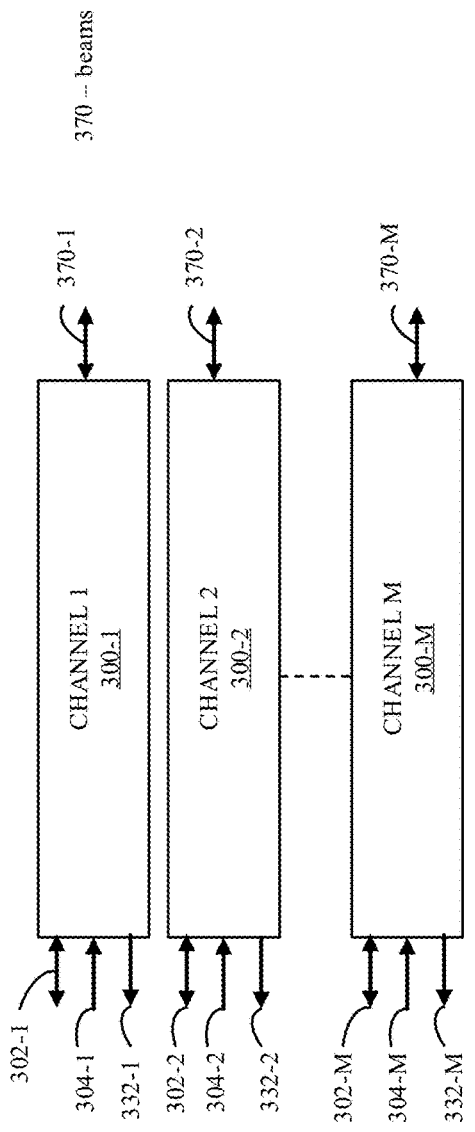
FIG. 5 shows a mobile communication base station including a number of the channels of FIG. 4.

FIG. 5 shows a mobile communication base station 380 which may be a 5G gNB which includes M-instances of mobile communication base station 300. The controller 310 for each channel may be combined into a single controller. Mobile communication base station 380 containing K sub-arrays of each having N=Nx*Ny elements and processing M=K data streams. A subarray may be considered as a group of antenna elements 354-1 to 354-N that transmits or receives the same RF signal, only having its RF phase and/or gain as a free parameter. In operation, the controller 310 may configure the operation mode of each mobile communication base station channel 300-1, 300-2, 300-M in a communications-transmit mode which may also be referred to as a Down Link (DL) mode, a sense-transmit (ST) mode, a communications-receive mode which may also be referred to as an Up Link (UL) mode, and a sense-receive mode (SR).

The mobile communication base station channel 300-1, 300-2, 300-M may have a radiation pattern corresponding to the beam direction and shape of the respective beams 370-1, 370-2, 370-M. The beam direction and shape may be determined by the beam index per symbol applied to the beam control input 356. The beam control input 356 controls the beamformer elements 346-1 to 346-N for each channel 300-1, 300-2, 300-M.

Figure 6A:
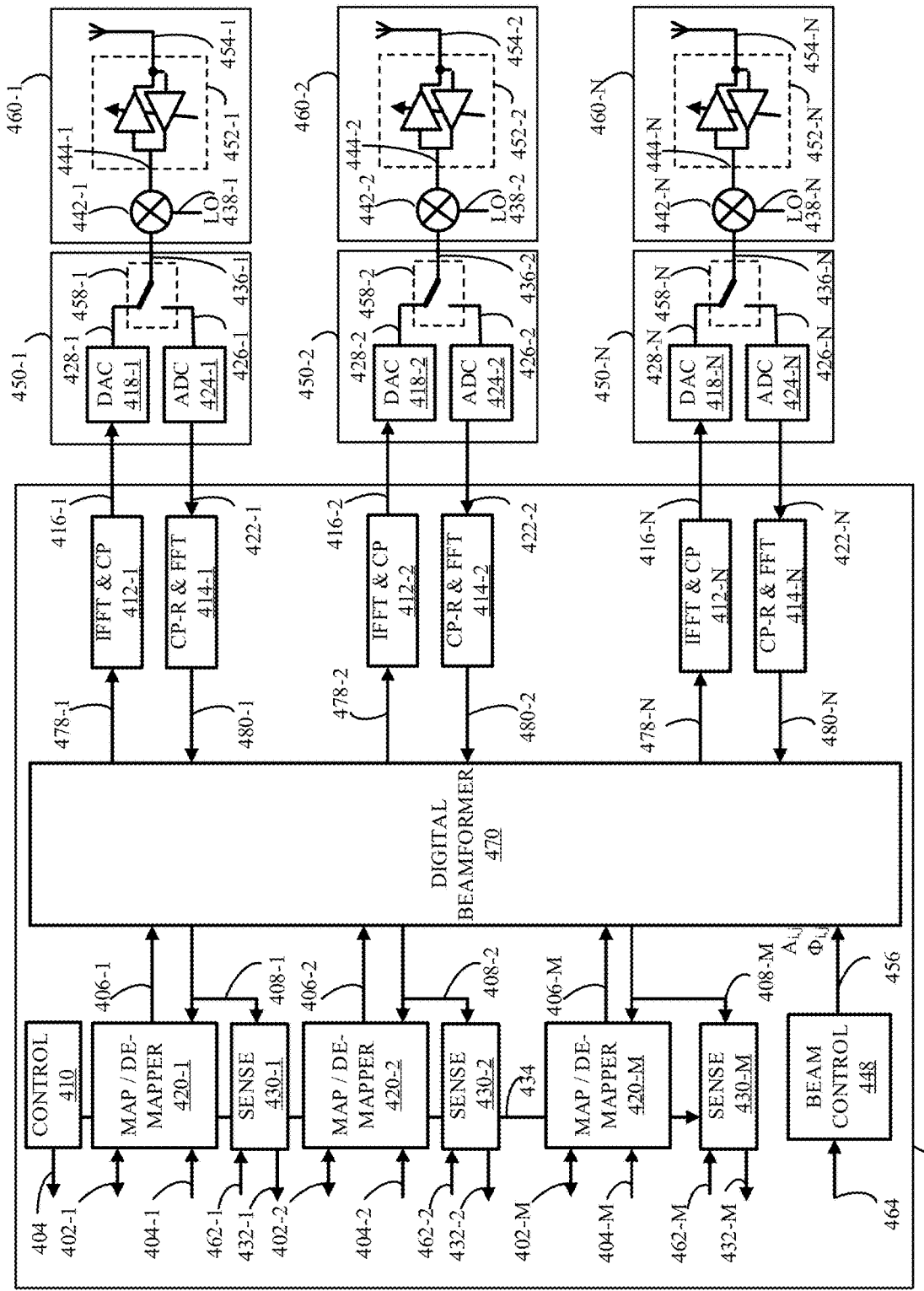
FIG. 6A shows a mobile communication base station including digital beamforming according to an embodiment.

FIG. 6A shows a mobile communication base station 400 using a digital beamformer 470 according to an embodiment. The mobile communication base station 400 has M channels or streams and N antennas. The mobile communication base station 400 includes N digital front-ends 450-1, 450-2 . . . 450-N, and N analog front ends 460-1, 460-2 . . . 460-M. The mobile communication base station 400 includes M carrier mapping de-mapping modules 420-1, 420-2 . . . 420-M, a controller 410, M sense modules 430-1, 430-2 . . . 430-M. The mobile communication base station 400 includes NiFFT and CP modules 412-1, 412-2 . . . 412-N, N FFT and CP-R modules 414-1, 414-2 . . . 414-N. Each of the digital front-ends 450-1, 450-2 . . . 450-N includes a DAC 418-1, 418-2 . . . 418-N, an ADC 424-1, 424-2 . . . 424-N and an antenna switch 458-1, 458-2 . . . 458-N. The analog front-ends 460-1, 460-2 . . . 460-M each include up-own converters 442-1, 442-2 . . . 442-N, transmit and receive amplifiers 452-1, 452-2 . . . 452-N, and antennas 454-1, 454-2 . . . 454-N. The mobile communication base station 400 includes a digital beamformer 470 connected between the carrier mapping de-mapping modules 420, and the iFFT and CP modules 412, and FFT and CP-R modules 414.

The controller 410 may have a control output 434 connected to the mapping de-mapping modules 420 and the sense modules 430. The carrier mapping-demapping module 420 may have a connection 402 which may receive or transmit orthogonal frequency division multiplexing (OFDM) symbols. Carrier mapping-demapping module 420 may have a carrier mapping input 404 which may be connected to a further control output of the controller 410. The carrier mapping de-mapping modules 420 may each have a transmit output 406 connected to the digital beam former 470. The carrier mapping de-mapping modules 420 may each have a receive input connected to a respective receive output 408 of the digital beamformer 470. Note that, for ease of understanding, multiple instances of a feature have the same base reference sign, such as "420-1, 420-2, . . . 420-N", may be referred to hereinunder by the base reference sign itself—in this case "420". Each receive output 408 of the digital beam former 470 may be connected to a sense input of the sense module 430. The sense modules 430 may each have an input 462 which in some examples may be connected to the transmit output 406. In other examples, the sense module input 462 may have an input connected to a transmit output of a different channel (not shown). In some example mobile communications systems including multiple mobile communications base stations 400, a first mobile communication base station may have a sense module input 462 connected to a channel of a second mobile communications base station. In these examples, the first mobile communication base station has a channel configured in a sense-receive mode and the second mobile communication base station has a channel configured in a sense-transmit mode.

An output 416 of each iFFT and CP module 412 may be connected to an input of a DAC 418. An input of the iFFT and CP module 412 may be connected to a transmit output 478 of the digital beamformer 470. An input 422 of each FFT and CP-R module 414 may be connected to an output of an ADC 424. An output of each FFT and CP-R module 414 may be connected to a receive input 480 of the digital beamformer 470. The output 428 of the DAC 418 may be connected to a first terminal of antenna switch 458. An input 426 of the ADC 424 may be connected to a second terminal of antenna switch 458. A third terminal 436 of the antenna switch 458 may be connected to a first terminal of the up-down converter 442. The up-down converter 442 may have a local oscillator input 438 and a second terminal 444 connected to a respective transmit and receive amplifier 452. Each transmit and receive amplifier 452 may be connected to a respective antenna 454. A beamformer controller 448 has a beam control input 464 and beam control output 456 connected to the digital beamformer 470.

In operation, the controller 410 may configure the operation mode of each mobile communication base station channel in a communications-transmit mode which may also be referred to as a Down Link (DL) mode, a sense-transmit (ST) mode, a communications-receive mode which may also be referred to as an Up Link (UL) mode, and a sense-receive mode (SR). The operation of the carrier mapping-demapping module 420 and sense module 430 in each channel is similar to carrier mapping-demapping module 120 and sense module 130. The iFFT and CP module 412 and FFT and CP-R module 414 operate in a similar way to the iFFT and CP module 112 and FFT and CP-R module 114 but as they are after the digital beam former 470, they are not assigned to a specific channel.

For mobile communication base station 400, the analog front-end 460 for the transmit and receive modes only performs amplification and up-down conversion. The beam forming is done in the digital domain by digital beamformer 470. For a given number of antenna elements N, in principle up to N streams can be mapped. Practically, up to 8 streams are being used. For a given panel size consisting of N antenna elements, this is potentially more than in the ABF case where M is fundamentally limited to K=Ntot/(Nx*Ny).

Figure 6B:
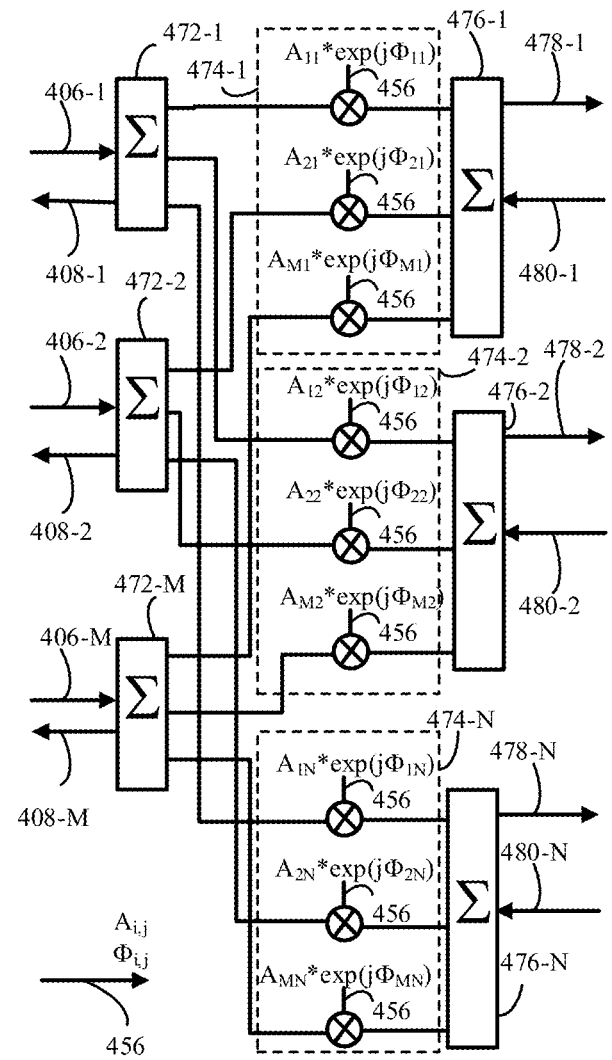
FIG. 6B shows an example implementation of a digital beamformer for the mobile communication base station of FIG. 6A.

FIG. 6B shows an example implementation for digital beamformer 470. The digital beamformer 470 includes a first series of M combiner-splitters 472 (472-1, 472-2 . . . 472-M), a second series of N combiner-splitters 476 (476-1, 476-2 . . . 476-N), and a series of N groups of multipliers 474 (474-1, 474-2 . . . 474-N), each multiplier group having M multipliers, each multiplier having a first terminal connected to the beam control output 456, a second terminal connected to a respective one of the first series of M combiner-splitters 472 and a third terminal connected to a respective one of the second series of N combiner-splitters 476. Each transmit output 406 is connected to a respective one of the first series of M combiner-splitters 472. The first series of M combiner-splitters 472 may have an output connected to a respective receive output 408 (408-1, 408-2 . . . 408-M) of the digital beamformer 470. Each transmit output 478 is connected to a respective one of the second series of N combiner-splitters 476. The second series of M combiner-splitters 472 may have an input connected to a respective receive input 480 of the digital beamformer 470.

The digital amplitude/phase shifters consist of complex multipliers 474 in the frequency-domain before the iFFT and CP module 412 for transmit and after the FFT and CP-R module 414 for receive. A matrix of M*N complex coefficients can arbitrarily map M streams onto N antenna elements 454. The amplitude value is denoted Aij and the phase ij where i is the stream value from 1 to M and j is the antenna element varying from 1 to N. The multipliers 474 may multiply the mapped-transmit-OFDM symbol for the i-th channel or stream by $A_{ij}*\exp(j*\Phi_{ij})$ for each value of j in the communications-transmit or sense transmit mode, or the output from the jth FFT and CP-R module 414 in the communications-receive or sense-receive mode which may include mapped-receive-OFDM symbols for more than one channel or stream by $A_{ij}*\exp(j*\Phi_{ij})$ for each value of i in the communications-receive or sense-receive mode.

Figure 7A:
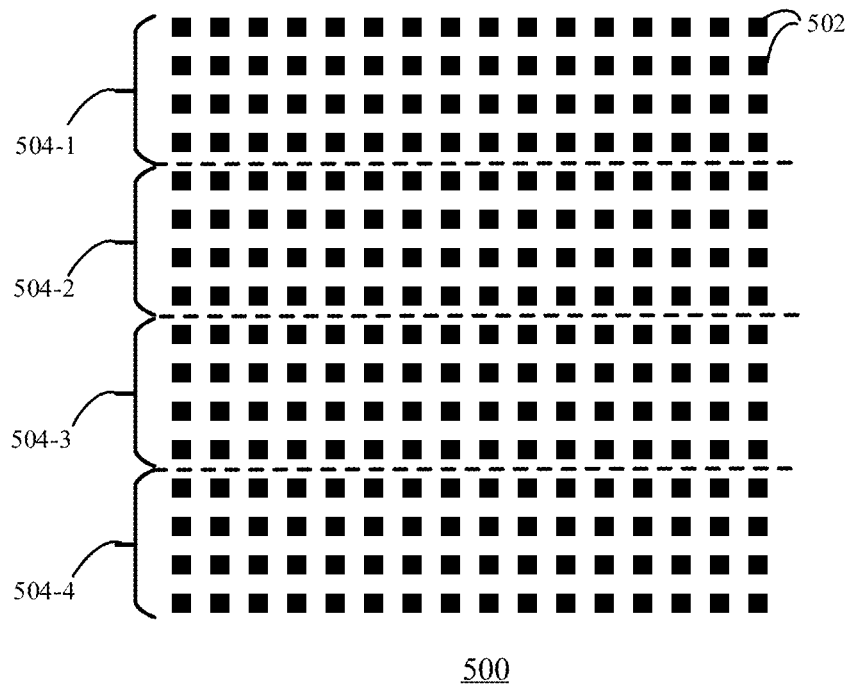
FIGS. 7A and 7B shows example antenna array partitioning for a mobile communication base station.

FIG. 7A shows an example of the partitioning of an antenna array 500 of 16×16 patch antennas 502 into 4 subarrays 504-1, 504-2, 504-3, 504-4 of 16×4 elements. Because of the wider aperture in horizontal direction, the beam will have high azimuth resolution and lower elevation resolution. This naturally fits to standard applications where users are widely spread over azimuth angles and ranges but are all near ground elevation level. In typical communication mode, for given symbol and given set of subcarriers, the panel could serve multiple users by 4 individual beams (4 streams multi-user MIMO) or single user by multiple beams (1 stream single-user MIMO).

Figure 7B:
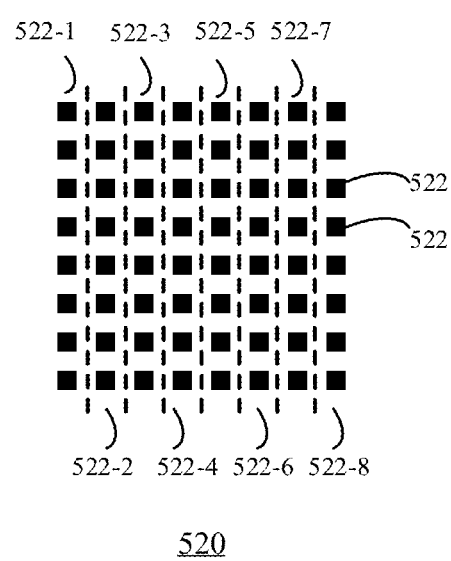

FIG. 7B shows an example of the partitioning of an antenna array 520 of 8×8 patch antennas 522 into 8 subarrays 522-1 to 522-8 of 1×8 elements. In typical communication mode, for given symbol and given set of subcarriers, the panel could serve multiple users by 8 individual beams (8 streams multi-user MIMO) or single user by multiple beams (1 stream single-user MIMO).

In 5G-NR, the concept of a Band Width Part (BWP) was introduced for communication. This means that the start frequency of the band and bandwidth of a contiguous set of OFDM carriers is flexible. In a BWP, only a part of the RF frequency spectrum is used. For example, in 5G mobile communication systems, a total bandwidth of 400 MHz may be split into a maximum of 4 bandwidth parts, each covering between 28 MHZ of bandwidth having 20 resource blocks of 12 carriers with 120 kHz spacing and 380 MHz of bandwidth having 264 resource blocks of 12 subcarriers with 120 kHz spacing. UEs only occasionally need the full bandwidth for DL or UL. Significant power saving can be achieved in the UE when using smaller bandwidth whenever that is sufficient, since a smaller bandwidth may allow the UE processor to work at reduced clock speed.

Figure 8A:
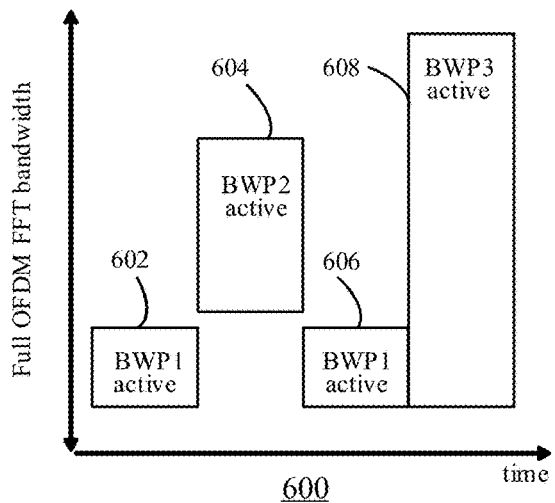
FIGS. 8A to 8C show and example of bandwidth part allocation for a mobile communication base station channel operating in a sensing mode of operation according to an embodiment.

FIG. 8A shows a graph 600 of an example of dynamic switching between BWPs in a communications-transmit or communications-receive mode of operation. The x-axis shows time and the Y axis shows the OFDM FFT bandwidth. During a first time period 602, a first bandwidth part may be active. In a second time period 604 a different second bandwidth part may be active. In a third time period 606 the first bandwidth part may be active. In a fourth time period 608 a third bandwidth part may be used which covers the full bandwidth (FB). In the present disclosure, the base-station and operating method of a base station may use bandwidth parts in the sensing mode for a different purpose to that intended of reducing power consumption in the UE. By using a bandwidth part in a sensing mode, the base station may use the same antenna array for simultaneous sensing and communication modes of operation.

Figure 8B:
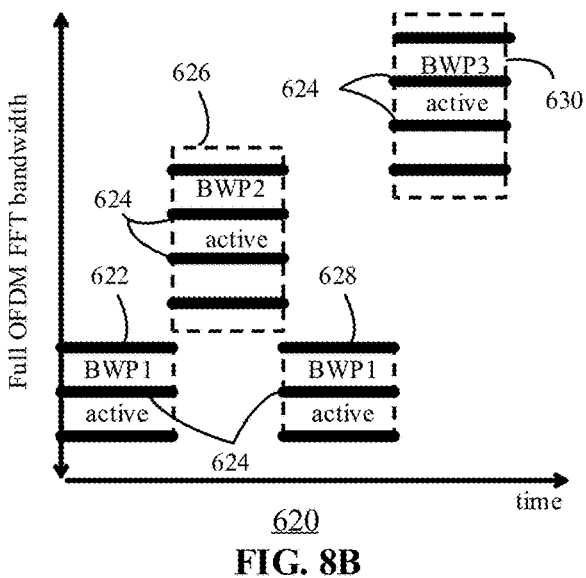
Figure 8C:
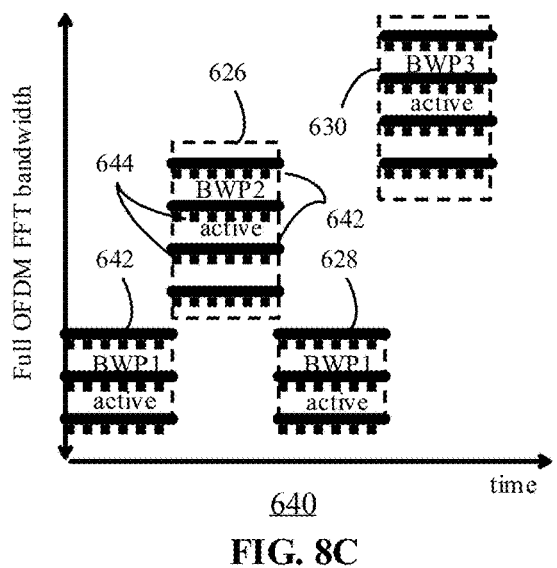

FIG. 8B shows a sensing mode of operation 620 using BWPs with split frequency bands using interleaved OFDM for different sensing streams according to an embodiment. During a first time period 622, a first bandwidth part may be active with the sensing OFDM symbols allocated to sections 624 of the BWP. In a second time period 626 a different bandwidth part may be active with the sensing OFDM symbols allocated to sections 624 of the BWP. In a third time period 628 the first bandwidth part may be active. In a fourth time period a third bandwidth part 630 may be used. FIG. 8C shows a sensing mode of operation 640 using BWPs with split frequency bands with multiple shifted OFDM spectra shown by continuous lines 642 and dashed lines 644.

The methods and mobile base stations described may use Frequency Division Multiple Access for allocating radar sensing bandwidth. Allocating different bandwidth parts BWP may more effectively use the total available bandwidth for radar sensing. In some examples, depending on the required spatial resolution Rr, allocate an appropriate BWP for sensing beams. In some examples an additional BWP may be used for sensing beams to be transmitted and received into/from another direction. Depending on expected or measured interference, assign a BWP for sensing adjacent or overlapping with BWP used for communication. The DL/ST/DL-ST/UL/SR/UL-SR operating mode and corresponding BWP assignment may be updated on any granularity of integer symbol length. Some examples are shown in the table 1 below. For sensing, separate beams are assigned for transmit and receive.

TABLE 1

|  | Mode 1<br>Radar BWP | Mode 2<br>Radar/DL BWP | Mode 3<br>Radar UL BWP |
| --- | --- | --- | --- |
| Beam 1 | ST BWP1 | ST BWP1 | ST BWP1 |
| Beam 2 | SR BWP1 | SR BWP1 | SR BWP1 |
| Beam 3 | ST BWP2 | DL1 BWP2 | UL1 BWP2 |
| Beam 4 | SR BWP2 | DL2 BWP2 | UL2 BWP2 |

In some examples the BWP assigned to radar may be split into M interleaved frequency spectra: Depending on required spatial range Ru, the spectrum may be freed-up by only modulating every Mth subcarrier (SC) for a single beam. This effectively increases the SC spacing by a factor of M. The free interleaved spectrum may be used for additional radar scanning beams, operating with a different offset in the SC selection. The DL/ST/DL-ST/UL/SR/UL-SR operating mode and corresponding BWP and IFDM assignment may be updated on any granularity of integer symbol length. Some examples are shown in table 2 below where Nsc is the number of sub carriers used for the OFDM modulation.

TABLE 2

|  | Mode 1<br>Radar BWP1<br>interleaved i =<br>1:Nsc/2/DL BWP2 | Mode 2<br>Radar BWP1<br>interleaved i =<br>1:Nsc/2/UL BWP2 |
| --- | --- | --- |
| Beam 1 | ST SC 1 + (i − 1)*2 | ST SC 1 + (i − 1)*2 |
| Beam 2 | SR SC 1 + (i − 1)*2 | SR SC 1 + (i − 1)*2 |
| Beam 3 | ST SC 2 + (i − 1)*2 | ST SC 2 + (i − 1)*2 |
| Beam 4 | SR SC 2 + (i − 1)*2 | SR SC 2 + (i − 1)*2 |
| Beam 5 | DL1 BWP2 | UL1 BWP2 |
| Beam 6 | DL2 BWP2 | UL2 BWP2 |
| Beam 7 | DL3 BWP2 | UL3 BWP2 |
| Beam 8 | DL4 BWP2 | UL4 BWP2 |

In a joint communication and sensing base station it may be desirable to simultaneously optimize communication throughput and sensing accuracy. Channel capacity from available time, bandwidth and spatial diversity should not be wasted. The formulas determining the unambiguous range $R_u$, Range resolution $R_r$, unambiguous Velocity $V_u$ and Velocity resolution $R_r$ in an OFDM-based radar are given in equations 1 to 4 below:

$$R_u = \frac{c \times T_{FFT}}{2} = \frac{c}{2 \times F_{sc}} \quad (1)$$

$$R_u = \frac{c \times T_r}{2} \quad (2)$$

$$V_r = \frac{c}{2 \times T_f \times f_c} \quad (3)$$

$$V_u = \frac{c}{4 \times T_{sep} \times f_c} \quad (4)$$

in which c is the velocity of light, $T_{FFT}$ the FFT length, $F_{sc}$ the subcarrier spacing and B the occupied bandwidth. $T_{sep}$ is the time between two sense symbols, Fc the RF frequency and $T_f$ the total frame length used to measure velocity.

FIGS. 9A-9D show radar sensing performance in different divisions of the available frequency spectrum for objects located at 5 m, 40 m, and 60 m. In a first case, shown in FIGS. 9A, 9B, a full bandwidth, which in this example is 1 GHz is used for radar. Graph 700 shows the frequency in GHz on the x-axis and magnitude in dB on the y axis. Graph 710 is a 3D plot with range in metres on the x-axis, velocity in meters/second on the y-axis and magnitude on the z-axis. In accordance with equations 1 . . . 4, this results in a range resolution Rr=0.15 m.

Figure 9A:
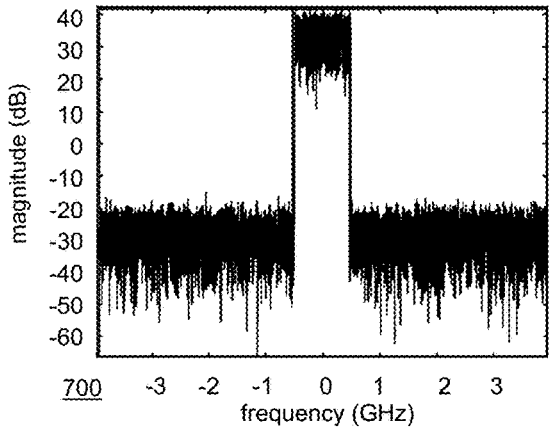
FIGS. 9A to 9F show a simulated range velocity plot with 3 objects.
Figure 9B:
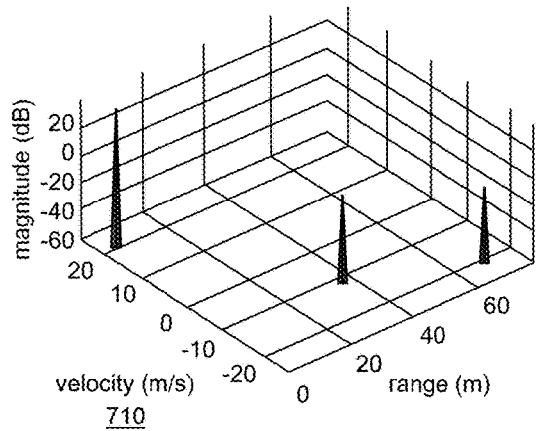
Figure 9C:
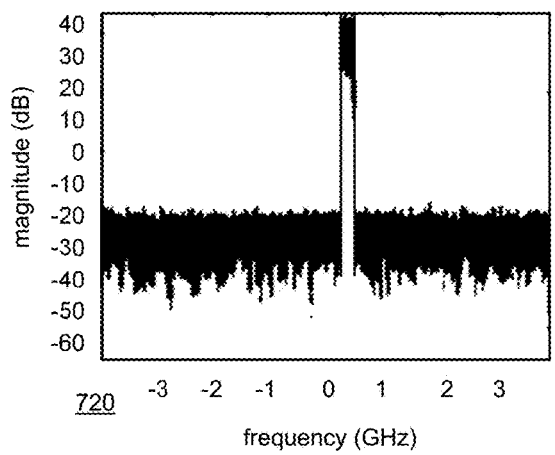
Figure 9D:
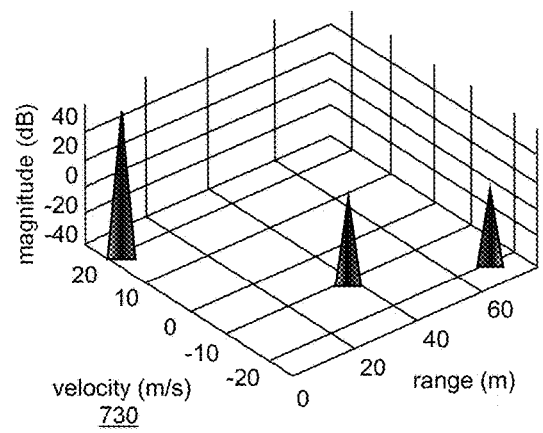

In a second case, illustrated by FIGS. 9C, and 9D only a 25% BWP corresponding to a bandwidth of 250 MHz is being used as shown in graph 720. The remaining 75% of the bandwidth can be used for other purpose. Graph 730 is a 3D plot with range in metres on the x-axis, velocity in meters/second on the y-axis and magnitude on the z-axis. This shows results a range resolution Rr=0.6 m.

Figure 9E:
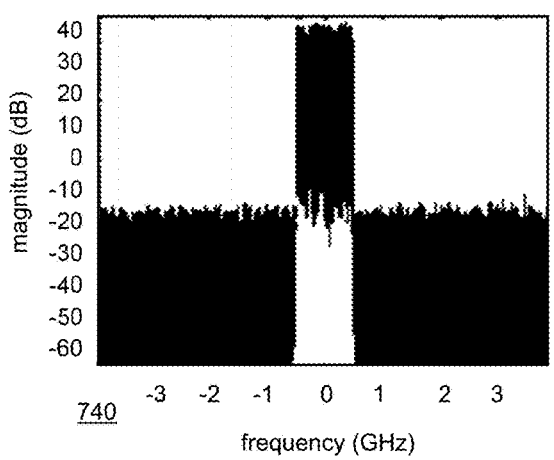
Figure 9F:
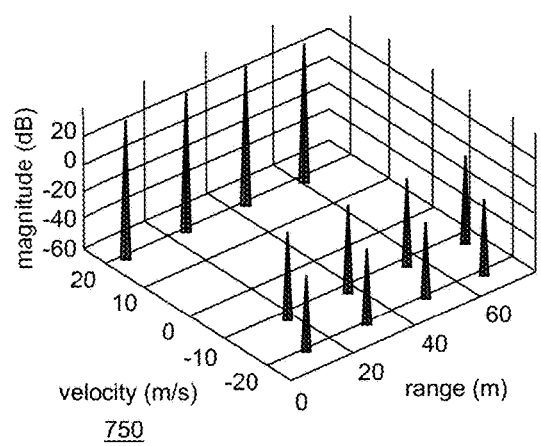

In a third case, illustrated by FIGS. 9E, and 9F the full 1 GHz bandwidth as shown in graph 740 is 1:4 interleaved. Also in this case, 75% of the remaining bandwidth can be used for other purposes. This 1:4 interleaving increases the effective sub-carrier (SC) spacing by a factor of 4, hence the unambiguous range reduced by a factor of 4 while range resolution is maintained. This is illustrated by graph 750 in a 3D plot with range in metres on the x-axis, velocity in meters/second on the y-axis and magnitude on the z-axis.

Figure 10:
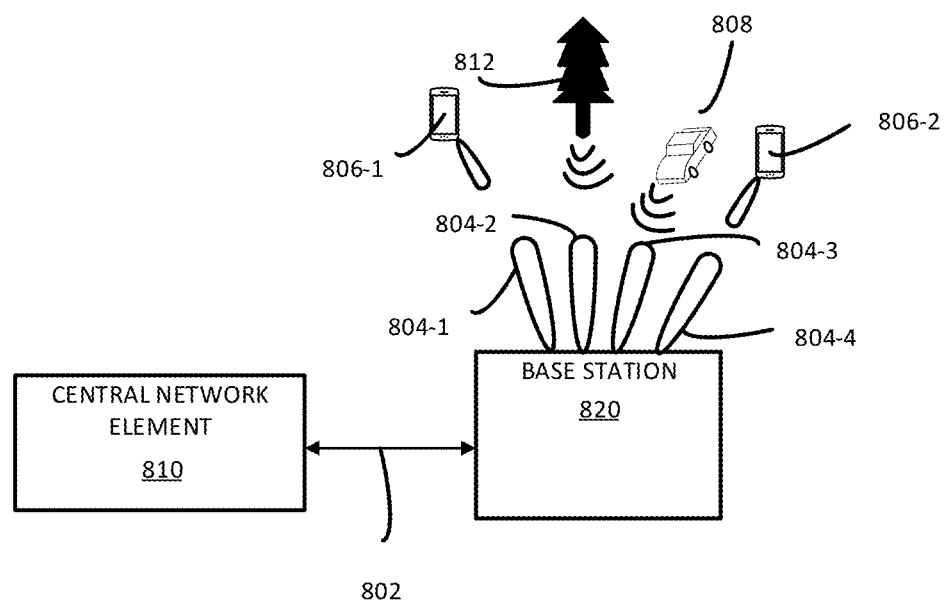
FIG. 10 shows a mobile communication system including a mobile communication base station according to an embodiment.

FIG. 10 shows a mobile communication system 800 including a central network element 810 and a base station 820 which may include a beam forming antenna/image radar sensor. Base station 820 may be implemented for example using a mobile communication base station 380, 400. The central network element 810 may be in communication via a link 802 with the base station 820. In some examples, the central network element 810 may implement a beamforming algorithm and provide the beam indexes to the base station. In other examples, sensing information retrieved from multiple base stations 820 may be combined into aggregated sensing data. Combining sensing data may allow false detections to be removed or make use of triangulation for more accurate determination of object location. The mobile communication system 800 may be a time division duplex (TDD) communications network. The base station 820 may configure sub-arrays of the antennas to communicate via beams 804 to various user equipment (UE) 806 and may be configured to transmit sensing symbol via beams 804 which reflect off objects such as for example trees 812 or vehicles 808. As illustrated, the base station 820 is configured as an example with one sub-array having four beams 804-1, 804-2, 804-3, 804-4. Beam 804-1 may be configured in communications-transmit mode or communications-receive mode using an allocated bandwidth part. Beam 804-2 may be configured in sense-transmit using a different allocated bandwidth part to the communications mode. Beam 804-3 may be configured in sense-receive mode using a the same bandwidth part as the sense-transmit. Beam 804-4 may be configured in communications-transmit mode or communications-receive mode using an allocated bandwidth part which is different to the bandwidth part of beams 804-1 to 804-3. The base station 820 may implement a communication channel to UE 806-1 via beam 804-1 and a communication channel to UE 806-2 via beam 804-2. The sense transmit beam 804-2 direction may vary as may sense receive beam 804-2 to build a radar image of the surroundings.

The mobile communication system 800 may include multiple base stations 820. In some examples, one of the base stations may have a channel configured in a sense-transmit mode and a different base station may have a channel configured in a sense receive mode. In other examples one or more base stations may have a channel configured in a sense transmit mode and the user equipment 806 may implement a sense module, for example sense module 130. The UE may be provided with the reference of the transmitted sense signal for example via a normal communication channel or some other means, and is configurable in a UE sense receive mode to sense a transmitted sense signal from one or more of the base stations, and determine for example a UE location from the transmitted sense signal.

Embodiments of the mobile communication base station and method may allow one or more antenna subarrays to process sensing symbols while other subarrays are processing communication symbols with relatively low communication BER and/or prevent cluttering in object detection.

Unlike communication mode, mono-static radar sensing normally requires full duplex operation. Sufficient isolation between transmitter and receiver practically implies using separate subarrays for sense transit and sense receive.

Yet, since a subarray using ABF cannot control the direction of radiation for communication and sensing independently, a subpanel in a conventional ABF system would only support the subset DL, ST, UL, SR. By using bandwidth parts, the mobile communication base station described herein may allow a single antenna array consisting of multiple sub arrays to operate in a combined sense and communication mode.

A mobile communication base station for joint communication and sensing and method of operation of a mobile communication base station is described. The mobile communication base station includes a baseband processor configurable to transmit and receive sensing and communication signals via one or channels. Each channel is configurable in one or more of a communications-transmit mode, a communications-receive mode, a sense-transmit mode and a sense-receive mode. For each channel, the baseband processor includes a carrier mapping-demapping module and a sense module. The baseband processor includes a controller coupled to the carrier mapping-demapping module and configured to control the carrier mapping-demapping module to of the one or more channels to: map the plurality of transmit-OFDM-symbols to a bandwidth part of an available OFDM bandwidth in the sense-transmit mode and the communications-transmit mode.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (arc) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A mobile communication base station for joint sensing and communication, the mobile communication base station comprising:

a baseband processor configurable to transmit and receive sensing and communication signals via one or more channels and further configurable in one or more of a communications-transmit mode, a communications-receive mode, a sense-transmit mode and a sense-receive mode, the baseband processor comprising, for each of the one or more channels:
a carrier mapping-demapping module configured to:
(i) in the communications-transmit mode and the sense-transmit mode, receive a plurality of transmit-OFDM-symbols, map the transmit-OFDM-symbols to a sub-carrier and output a plurality of mapped-transmit-OFDM-symbols, and
(ii) in the communications-receive mode, receive a plurality of mapped-receive-OFDM-symbols, de-map the mapped-receive-OFDM-symbols and output a plurality of receive-OFDM-symbols;
a sense module configured in the sense-receive mode to compare the plurality of mapped-receive-OFDM-symbols with the plurality of transmit-OFDM-symbols from the same channel or a different channel; and determine at least one of a range, velocity, and angle-of-arrival of a sensed object from the comparison; and
wherein the baseband processor further comprises:
a controller coupled to the carrier mapping-demapping module of the one or more channels and configured to control the carrier mapping-demapping module of the one or more channels to:
map the plurality of transmit-OFDM-symbols to a bandwidth part of an available OFDM bandwidth in the sense-transmit mode and the communications-transmit mode.

2. The mobile communication base station of claim 1, wherein the baseband processor further comprises:
a frequency-to-time conversion module configured to, in each of the communications-transmit mode and the sense-transmit mode, receive the plurality of mapped-transmit-OFDM-symbols from the carrier mapping-demapping module of at least one channel of the one of more channels and output a transmit-baseband-signal; and
a time-to-frequency conversion module configured to, in each of the communications-receive mode and the sense-receive mode, receive a receive-baseband-signal and output the plurality of mapped-receive-OFDM-symbols to the carrier mapping-demapping module of the at least one channel.

3. The mobile communication base station of claim 1, wherein the controller is further configured to control the carrier mapping-demapping module to: in the sense-transmit mode, map the plurality of transmit-OFDM-symbols on sub-carriers within segments of a bandwidth part of the available OFDM bandwidth.

4. The mobile communication base station of claim 1, wherein the sense module further comprises a series arrangement of a divider, a frequency-to-time conversion module, a time-to-range conversion module and an FFT module.

5. The mobile communication base station of claim 1, wherein the baseband processor further comprises:
a digital beamformer configured and arranged to beamform the plurality of transmit-OFDM-symbols for transmission via an antenna array in the communications-transmit mode or sense-transmit mode and to beamform the plurality of mapped-receive-OFDM-symbols received via the antenna array in the communications-receive mode or sense-receive mode.

6. The mobile communication base station of claim 5, wherein the one or more channels comprises a plurality of channels and wherein:
a first channel of the plurality of channels is configured in the sense-transmit mode to transmit in a first beam direction;
a second channel of the plurality of channels is configured in the sense-receive mode to receive in a second beam direction;
a third channel of the plurality of channels is configured in the sense-transmit mode to transmit in a third beam direction; and
a fourth channel of the plurality of channels is configured in the sense-receive mode to receive in a fourth beam direction.

7. The mobile communication base station of claim 6, wherein the bandwidth of the bandwidth part of the first channel and the bandwidth part of the second channel is different to the bandwidth of the bandwidth part of the third channel and the bandwidth part of the fourth channel.

8. The mobile communication base station of claim 5, wherein the one or more channels comprises a plurality of channels and wherein:
a first channel of the plurality of channels is configured in the sense-transmit mode to transmit in a first beam direction;
a second channel of the plurality of channels is configured in the sense-receive mode to receive in a second beam direction;
a third channel of the plurality of channels is configured in the communications-transmit mode to transmit in a third beam direction; or in the communications-receive mode to receive in the third beam direction;
a fourth channel of the plurality of channels is configured in the communications-transmit mode to transmit in a fourth beam direction; or in the communications-receive mode to receive in the fourth beam direction.

9. The mobile communication base station of claim 5, wherein the one or more channels comprises a plurality of channels and wherein:
a first channel of the plurality of channels is configured in the sense-transmit mode to transmit a first beam;
a second channel of the plurality of channels is configured in the sense-receive mode to receive a second beam;
a third channel of the plurality of channels is configured in the sense-transmit mode to transmit a third beam;
a fourth channel of the plurality of channels is configured in the sense-receive mode to receive a fourth beam;
a fifth channel of the plurality of channels is configured in the communications-transmit mode to transmit a fifth beam; or in the communications-receive mode to receive a fifth beam;
a sixth channel of the plurality of channels is configured in the communications-transmit mode to transmit a sixth beam; or in the communications-receive mode to receive a sixth beam;
a seventh channel of the plurality of channels is configured in the communications-transmit mode to transmit a seventh beam; or in the communications-receive mode to receive a seventh beam;
an eighth channel of the plurality of channels is configured in the communications-transmit mode to transmit an eighth beam; or in the communications-receive mode to receive an eighth beam;
wherein the bandwidth of the bandwidth part of the first channel, the second channel, the third channel, and the fourth channel is the same bandwidth;

and wherein the mapped-transmit-OFDM-symbols of the first beam are interleaved in different segments of the bandwidth part than the mapped-transmit-OFDM-symbols of the third beam.

10. The mobile communication base station of claim 1, further comprising a digital front-end and an analog front-end, the digital front-end comprising:
a digital to analog converter configured in the communications-transmit mode or sense-transmit mode to convert the transmit-baseband-signal to an analog transmit-baseband-signal;
an analog to digital converter configured in the communications-receive mode or sense-receive mode to convert an analog receive-baseband-signal to the receive-baseband-signal; and the analog front-end comprising:
an up-down converter;
a transmit amplifier and receive amplifier; and
at least one antenna;
wherein the analog-front end is configured to:
in the communications-transmit mode or sense-transmit mode, up-convert the analog transmit-baseband-signal to a transmit-signal transmitted via the transmit amplifier and the at least one antenna; and
in the communications-receive mode or sense-receive mode, down-convert a receive-signal to the receive-baseband-signal, the receive-signal being received via the at least one antennas and the receive amplifier.

11. The mobile communication base station of claim 10, wherein the at least one antenna comprises a plurality of antennas, and the analog front-end further comprises:
an analog beamformer configured and arranged to:
in the communications-transmit mode or sense-transmit mode, beamform the analog transmit-signal for transmission via the plurality of antennas; and
in the communications-receive mode or sense-receive mode, beamform the analog receive signal received via the plurality of antennas.

12. The mobile communication base station of claim 1, wherein a first channel of the one or more channels is configured in a sense-transmit mode, and a second channel of the one or more channels is configured in a sense-receive mode; and wherein the first channel is configured to:
map each sensing OFDM symbol of a plurality of OFDM sensing symbols on a respective carrier in a bandwidth part;
convert a sensing OFDM signal to the time-domain, the sensing OFDM signal comprising the plurality of mapped OFDM sensing symbols;
convert the time-domain OFDM sensing signal to an analog sensing signal;
up-convert the analog sensing signal;
transmit a transmit signal comprising the up-converted analog sensing signal; and
the second channel is configured to:
down-convert a receive signal comprising the plurality of OFDM sensing symbols;
convert the down-converted receive signal to a digital down-converted receive signal convert the digital down-converted receive signal to the frequency domain; and
determine at least one of the range, velocity and angle of arrival from a comparison of the digital down-converted receive signal and the plurality of OFDM sensing symbols.

13. A mobile communication system comprising:
a plurality of mobile communication base stations, wherein each mobile communication base station of the plurality of mobile communication base stations includes:
a baseband processor configurable to transmit and receive sensing and communication signals via one or more channels and further configurable in one or more of a communications-transmit mode, a communications-receive mode, a sense-transmit mode and a sense-receive mode, the baseband processor comprising, for each of the one or more channels:
a carrier mapping-demapping module configured to:
(i) in the communications-transmit mode and the sense-transmit mode, receive a plurality of transmit-OFDM-symbols, map the transmit-OFDM-symbols to a sub-carrier and output a plurality of mapped-transmit-OFDM-symbols, and
(ii) in the communications-receive mode, receive a plurality of mapped-receive-OFDM-symbols, de-map the mapped-receive-OFDM-symbols and output a plurality of receive-OFDM-symbols;
a sense module configured in the sense-receive mode to compare the plurality of mapped-receive-OFDM-symbols with the plurality of transmit-OFDM-symbols from the same channel or a different channel; and determine at least one of a range, velocity, and angle-of-arrival of a sensed object from the comparison; and
wherein the baseband processor further comprises:
a controller coupled to the carrier mapping-demapping module of the one or more channels and configured to control the carrier mapping-demapping module of the one or more channels to:
map the plurality of transmit-OFDM-symbols to a bandwidth part of an available OFDM bandwidth in the sense-transmit mode and the communications-transmit mode; and
wherein a channel of at least one of the plurality of mobile communication base stations is configured in the sense-transmit mode and a user equipment apparatus is configured in a user equipment sense-receive mode to detect a transmitted sense signal from the at least one of the plurality of mobile communication base stations.

14. A mobile communication system comprising:
a plurality of mobile communication base stations, wherein each mobile communication base station of the plurality of mobile communication base stations includes:
a baseband processor configurable to transmit and receive sensing and communication signals via one or more channels and further configurable in one or more of a communications-transmit mode, a communications-receive mode, a sense-transmit mode and a sense-receive mode, the baseband processor comprising, for each of the one or more channels:
a carrier mapping-demapping module configured to:
(i) in the communications-transmit mode and the sense-transmit mode, receive a plurality of transmit-OFDM-symbols, map the transmit-OFDM-symbols to a sub-carrier and output a plurality of mapped-transmit-OFDM-symbols, and
(ii) in the communications-receive mode, receive a plurality of mapped-receive-OFDM-symbols, de-map the mapped-receive-OFDM-symbols and output a plurality of receive-OFDM-symbols;
a sense module configured in the sense-receive mode to compare the plurality of mapped-receive-OFDM-symbols with the plurality of transmit-OFDM-symbols from the same channel or a different channel; and determine at least one of a range, velocity, and angle-of-arrival of a sensed object from the comparison; and wherein the baseband processor further comprises:

a controller coupled to the carrier mapping-demapping module of the one or more channels and configured to control the carrier mapping-demapping module of the one or more channels to:

map the plurality of transmit-OFDM-symbols to a bandwidth part of an available OFDM bandwidth in the sense-transmit mode and the communications-transmit mode; and wherein a channel of a first mobile communication base station of the plurality of mobile communication base stations is configured in the sense-transmit mode and a channel of a second mobile communication base station of the plurality of mobile communication base stations is configured in the sense-receive mode.

15. A method of joint sensing and communication for a mobile communication base station configurable to transmit and receive sensing and communication signals via one or more channels and further configurable in one or more of a communications-transmit mode, a communications-receive mode, a sense-transmit mode and a sense-receive mode, the method comprising, for each of the one or more channels:

(i) in the communications-transmit mode and the sense-transmit mode, receiving a plurality of transmit-OFDM-symbols, mapping the transmit-OFDM-symbols to a sub-carrier and outputting a plurality of mapped-transmit-OFDM-symbols, and (ii) in the communications-receive mode, receiving a plurality of mapped-receive-OFDM-symbols, de-mapping the mapped-receive-OFDM-symbols and outputting a plurality of receive-OFDM-symbols;

in the sense-receive mode, comparing the plurality of mapped-receive-OFDM-symbols with the plurality of transmit-OFDM-symbols from the same channel or a different channel; and determining at least one of a range, velocity, and angle-of-arrival of a sensed object from the comparison; and wherein the method further comprises:

mapping the plurality of transmit-OFDM-symbols to a bandwidth part of an available OFDM bandwidth in the sense-transmit mode and the communications-transmit mode.

16. The method of claim 15, further comprising:

in each of the communications-transmit mode and the sense-transmit mode, generating a transmit-baseband-signal by converting the plurality of mapped-transmit-OFDM-symbols from at least one channel of the one of more channels from the frequency domain to the time domain; and in each of the communications-receive mode and the sense-receive mode, generating a plurality of mapped-receive-OFDM-symbols by converting a receive-baseband-signal from at least one channel of the one of more channels from the time domain to the frequency domain.

17. The method of claim 15, further comprising:

in the sense-transmit mode, mapping the plurality of transmit-OFDM-symbols on sub-carriers within segments of a bandwidth part of the available OFDM bandwidth.

18. The method of claim 15, wherein the one or more channels comprises a plurality of channels, and wherein the method further comprises:

configuring a first channel of the plurality of channels in the sense-transmit mode for transmitting in a first beam direction;

configuring a second channel of the plurality of channels in the sense-receive mode for receiving in a second beam direction;

configuring a third channel of the plurality of channels in the sense-transmit mode for transmitting in a third beam direction; and configuring a fourth channel of the plurality of channels in the sense-receive mode for receiving in a fourth beam direction.

19. The method of claim 15, wherein the one or more channels comprises a plurality of channels, and wherein the method further comprises:

configuring a first channel of the plurality of channels in the sense-transmit mode for transmitting in a first beam direction;

configuring a second channel of the plurality of channels in the sense-receive mode for receiving in a second beam direction;

configuring a third channel of the plurality of channels in the communications-transmit mode to transmit in a third beam direction or configuring the third channel in the communications-receive mode to receive in the third beam direction; and configuring a fourth channel of the plurality of channels in the communications-transmit mode to transmit in a fourth beam direction or configuring the fourth channel in the communications-receive mode to receive in the fourth beam direction.

20. The method of claim 15, wherein a first channel of the one or more channels is configured in a sense-transmit mode and a second channel of the one or more channels is configured in a sense-receive mode; and wherein the method comprises, configuring the first channel to:

map each sensing OFDM symbol of a plurality of OFDM sensing symbols on a respective carrier in the bandwidth part;

convert a sensing OFDM signal to the time domain, the sensing OFDM signal comprising the plurality of mapped OFDM sensing symbols;

convert the time-domain OFDM sensing signal to an analog sensing signal;

up-convert the analog sensing signal;

transmit a transmit signal comprising the up-converted analog sensing signal; and the configuring the second channel to:

down-convert a receive signal comprising the plurality of OFDM sensing symbols;

convert the down-converted receive signal to a digital down-converted receive signal convert the digital down-converted receive signal to the frequency domain; and determine at least one of the range, velocity and angle of arrival from a comparison of the digital down-converted receive signal and the plurality of OFDM sensing symbols.

* * * * *